United States Patent
Card

(10) Patent No.: US 6,547,043 B2
(45) Date of Patent: Apr. 15, 2003

(54) TUNEABLE STEERING DAMPER USING MAGNETO-RHEOLOGICAL FLUID

(75) Inventor: James Myrl Card, Linwood, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/773,071

(22) Filed: Jan. 31, 2001

(65) Prior Publication Data

US 2001/0054527 A1 Dec. 27, 2001

Related U.S. Application Data

(60) Provisional application No. 60/179,175, filed on Jan. 31, 2000.

(51) Int. Cl.[7] .................................................. F16F 9/53
(52) U.S. Cl. ..................... 188/267.2; 188/290; 280/779; 280/93.514
(58) Field of Search ............................ 188/267, 267.1, 188/267.2, 290; 267/140.11, 140.14, 140.15; 280/773, 775, 779, 93.508, 93.51, 93.514, 93.515

(56) References Cited

U.S. PATENT DOCUMENTS

| | | |
|---|---|---|
| 3,174,587 A | 3/1965 | Walton |
| 3,926,070 A | 12/1975 | Busso .......................... 74/498 |
| 4,588,198 A | 5/1986 | Kanazawa et al. |
| 5,398,917 A | 3/1995 | Carlson et al. ......... 267/140.14 |
| 5,549,837 A * | 8/1996 | Ginder et al. ............ 252/62.52 |
| 5,603,391 A | 2/1997 | Class et al. |
| 5,667,715 A | 9/1997 | Foister ..................... 252/62.52 |
| 5,829,319 A | 11/1998 | Mokeddem ................... 74/574 |
| 5,878,851 A * | 3/1999 | Carlson et al. ............. 188/267 |
| 5,947,238 A | 9/1999 | Jolly et al. ................ 188/267.1 |
| 5,956,951 A | 9/1999 | O'Callaghan ................ 60/326 |
| 5,957,016 A | 9/1999 | Segalman et al. ........... 82/1.11 |
| 5,984,385 A | 11/1999 | Shtarkman et al. ...... 292/251.5 |
| 6,019,201 A | 2/2000 | Gordaninejad et al. .. 188/267.1 |
| 6,068,249 A | 5/2000 | Shtarkman ............. 267/140.14 |
| 6,158,470 A * | 12/2000 | Ivers et al. .................. 137/807 |
| 6,193,206 B1 | 2/2001 | Yasuda et al. .............. 248/550 |
| 6,279,701 B1 * | 8/2001 | Namuduri et al. ....... 188/267.2 |
| 6,279,952 B1 | 8/2001 | Van Wynsberghe et al. ..... 280/777 |
| 6,318,520 B1 * | 11/2001 | Lisenker et al. ............ 188/267 |
| 6,318,522 B1 * | 11/2001 | Johnston et al. ......... 188/267.2 |

* cited by examiner

Primary Examiner—C. T. Bahz
Assistant Examiner—Pamela Rodriguez
(74) Attorney, Agent, or Firm—Edmund P. Anderson

(57) ABSTRACT

A linear vibration damping system includes a piston slideably disposed within a cylinder, a magneto-rheological fluid disposed within the cylinder, and a magnet disposed in magnetic communication with the magneto-rheological fluid. A rotary vibration damping system includes a cylinder having a steering shaft extending therethrough, a magneto-rheological fluid disposed between an inner surface of the cylinder and an outer surface of the steering shaft, and a magnet disposed in magnetic communication with the magneto-rheological fluid. In either system, the magnet is controllable to provide variable control of the magneto-rheological fluid. A method of damping vibrations in a motor vehicle includes disposing a magneto-rheological fluid at a source of vibration in the motor vehicle, controlling the magneto-rheological fluid to effectuate a structural change in the magneto-rheological fluid, and subjecting the magneto-rheological fluid to a vibration from the source of the vibration.

5 Claims, 4 Drawing Sheets

TUNEABLE STEERING DAMPER USING MAGNETO-RHEOLOGICAL FLUID

CROSS REFERENCE TO RELATED APPLICATION

This application claims the benefit of U.S. Provisional Patent Application No. 60/179,175, filed Jan. 31, 2000, the content of which is incorporated herein by reference in its entirety.

TECHNICAL FIELD

This disclosure relates to steering systems for motor vehicles, and, more particularly, to a steering damping device that utilizes a magneto-rheological fluid to controllably dampen vibratory motion.

BACKGROUND

Vibration is an oscillatory motion about an equilibrium point. If the oscillatory motion is the result of a forcing function that is applied once and then removed, the oscillatory motion is known as natural or free vibration. However, if a forcing function is applied repeatedly to a system, the motion is known as forced vibration. Such forced vibration may be periodic, impulse, stepped, or random in nature.

Vibration within a motor vehicle is almost always forced vibration. Impulse-type forced vibrations typically result from the movement of the motor vehicle over a road surface, which almost always includes some degree of irregularity therein to cause a jarring motion to the motor vehicle. Such jarring motion is known as "roadfeel" and is typically transferred from the road surface through the steerable wheels and through the steering system and chassis of the motor vehicle to a steering device such as a hand steering wheel where it is experienced by an operator of the motor vehicle. The forced vibrations may also be the result of the normal operation of the engine of the motor vehicle and its accessory drive systems, which typically causes oscillatory motion of the motor vehicle that is periodic in nature.

Typical methods of compensating for the forced vibrations transmitted to the operator include conventionally structured shock absorbing devices and/or variation of the "stiffness" of components associated with the shock absorbing devices. These devices can include a liquid disposed therein in order to effectuate viscous damping of the vibrations. The devices comprise the suspension system of the motor vehicle and are most often mounted between the steerable wheels and the chassis to damp the vibration that results from movement of the motor vehicle across the road surface, thereby effectively buffering the operator and passengers of the motor vehicle from roadfeel. Such devices generally provide a constant damping force that may be exceeded by excessive vibration, which typically results when the motor vehicle encounters potholes or other extreme variations in the road surface. Regardless of the magnitude of the disturbing force causing the vibration, some level of comfort is generally afforded to all of the occupants of the motor vehicle. However, because the operator almost always has both of his hands on a steering device having direct mechanical communication with the steerable wheels through the steering system, and because the steering system is generally not damped, the operator experiences roadfeel that may not be otherwise experienced by the passengers.

SUMMARY

A vibration damping system for a motor vehicle and a method of damping vibrations resulting from roadfeel using magneto-rheological fluid to selectively dampen vibratory motion are disclosed herein. A linear vibration damping system includes a piston slideably disposed within a cylinder, a magneto-rheological fluid disposed within the cylinder, and a magnet disposed in magnetic communication with the magneto-rheological fluid. The magnet is typically an electromagnet that is variably controllable to provide control of the magneto-rheological fluid at the individual particle level. The cylinder may be mounted to the chassis of the motor vehicle, and the piston may be mounted to the steering system of the motor vehicle. The variable control of the magneto-rheological fluid may be effectuated through a controller configured to generate a signal that corresponds to a vibration sensed by the steering system. The generated signal may ultimately effectuate a change in the magneto-rheological fluid such that a frequency of the vibration sensed by the steering system is substantially equal to a frequency of the signal from the controller.

A rotary vibration damping system includes a cylinder having a steering shaft extending therethrough. A magneto-rheological fluid is disposed between an inner surface of the cylinder and an outer surface of the steering shaft. A magnet, which may be an electromagnet that is variably controllable, is disposed in magnetic communication with the magneto-rheological fluid. The magnet is controllable to provide variable control of the magneto-rheological fluid. The control of the magnet may be in response to a signal generated from a controller. The generated signal may ultimately effectuate a change in the magneto-rheological fluid such that a frequency of the vibration sensed by the steering system is substantially equal to a frequency of the signal from the controller.

A method of damping vibrations in a motor vehicle includes disposing a magneto-rheological fluid at a source of vibration in the motor vehicle, controlling the magneto-rheological fluid to effectuate a structural change in the magneto-rheological fluid, and subjecting the magneto-rheological fluid to a vibration from the source of the vibration. The control of the magneto-rheological fluid may include applying an electromotive force to a magnet disposed proximate the magneto-rheological fluid and forming magnetizable particles of the magneto-rheological fluid into fibrous structures that impart Bingham plastic rheological behavior to the magneto-rheological fluid.

DETAILED DESCRIPTION

Figure 1:
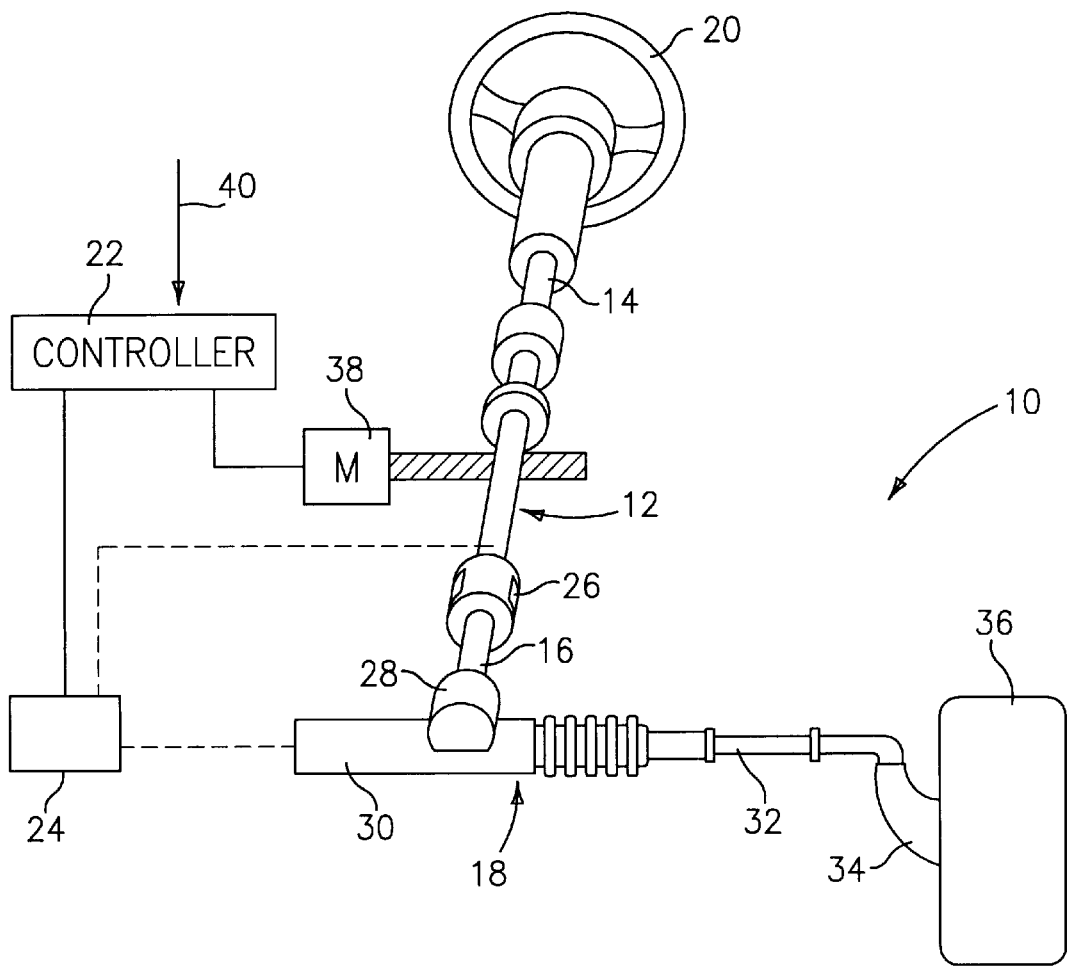
FIG. 1 is a schematic diagram of a steering system of a motor vehicle utilizing a tuneable damping apparatus.

Referring to FIG. 1, a steering system for a motor vehicle is shown generally at 10 and is hereinafter referred to as "system 10." System 10 is typically powered such that the steering of the motor vehicle is assisted through the use of electronics or hydraulics. System 10 comprises a steering shaft, shown generally at 12, having an upper steering shaft 14 and a lower steering shaft 16, a rack and pinion steering mechanism, shown generally at 18, disposed in operable communication with lower steering shaft 16, a hand steering device 20, which may be a steering wheel, disposed in operable communication with upper steering shaft 14, a controller 22 disposed in operable communication with steering shaft 12, and a damping system 24 disposed either between rack and pinion steering mechanism 18 and controller 22 or between steering shaft 12 and controller 22. Upon rotation of hand steering device 20, upper steering shaft 14 turns lower steering shaft 16 through a universal joint 26. Lower steering shaft 16 turns a pinion gear (not shown) disposed under a housing 28, which in turn effectuates the lateral translation of a rack 30 thereacross. The lateral translation of rack 30 moves tie rods 32 (only one of which is shown), each of which move steering knuckles 34 (only one of which is shown), thereby effectuating the movement of at least one steerable wheel 36 to steer the motor vehicle.

Vibration signals 40 are received by controller 22 from vibration sensing devices (not shown). Controller 22 is configured to effectuate the power-assisted rotation of steering shaft 12 through a motor 38. Controller 22 is also configured to respond to vibration signals 40, thereby providing closed-loop control of damping system 24. (Damping system 24 can also operate in an open-loop control mode by having controller 22 configured to be responsive to input signals such as vehicle speed or handwheel angle and when the magneto-rheological fluid device is controlled relative to present parameters from such input signals.) Damping system 24 is controllable or "tuneable" in the sense that it responds to vibration signals 40 from controller 22 to provide counter effects to "roadfeel," or vibratory motion experienced by the motor vehicle through steerable wheels 36 and rack and pinion steering mechanism 18. Such counter effects are typically achieved through the manipulation of a magneto-rheological fluid (not shown), which is disposed within damping system 24. A magnet (shown below with reference to FIG. 2) is configured to actuate the magneto-rheological fluid by enabling calculated adjustments to be made to the magneto-rheological fluid through controller 22 in response to the roadfeel. The calculated adjustments typically comprise the magnetic alignment of the particles of the magneto-rheological fluid into fibrous structures.

The magneto-rheological fluid typically comprises a random dispersion of magnetizable particles suspended in a base carrier liquid such as mineral oil, synthetic hydrocarbon, water, silicone oil, esterified fatty acid, or some other suitable organic liquid. A silica compound is typically added to the suspension to impart thixotropic properties to the suspension, thereby preventing the magnetic particles from precipitating out of the suspension. The particles are of a characteristic hardness and are generally microspheric in structure. The particles may be carbonyl iron particles having a surfactant chemically bonded onto the surface thereof. Other types of particles that may be used for the magneto-rheological fluid include, but are not limited to, nickel, cobalt, and alloys thereof. The electromagnetic nature of the magneto-rheological fluid allows for the selective and variably actuatable control of the amount of damping action provided by damping system 24. Magneto-rheological fluids are described in detail by Foister in U.S. Pat. No. 5,667,715 entitled "Magnetorheological Fluids," which is incorporated herein by reference in its entirety.

Figure 2:
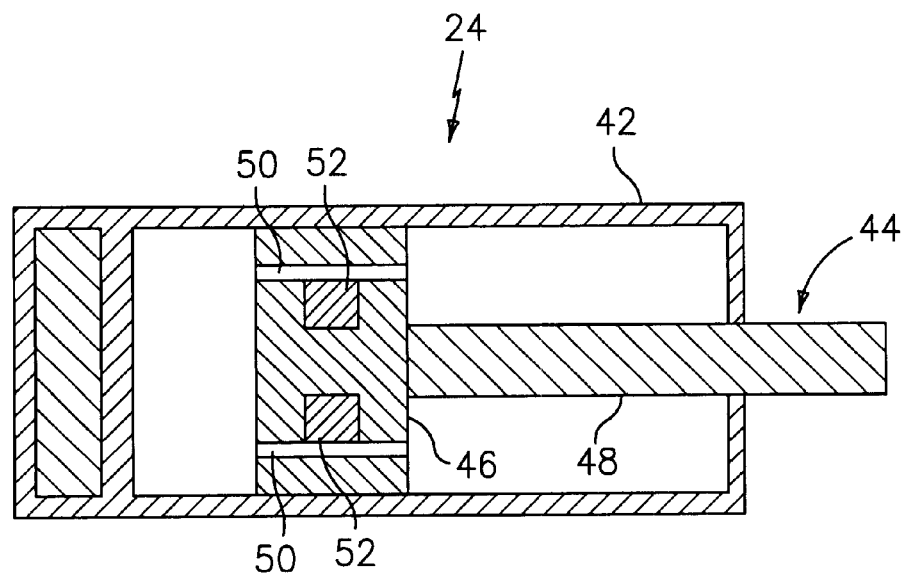
FIG. 2 is schematic diagram of a linear damping system.

Referring now to FIG. 2, damping system 24 as it would be disposed between rack and pinion steering mechanism 18 and controller 22 is shown in greater detail. Damping system 24 comprises a cylinder 42 having a piston, shown generally at 44, slideably disposed therein. Cylinder 42 is mounted to an interior surface (not shown) (e.g., the chassis) of the motor vehicle. Piston 44 is defined by a head 46 and a rod 48 connected at a first end thereof to head 46. A second end of rod 48 is connected to the rack. In a typical installation of damping system 24, both cylinder 42 and the second end of rod 48 are flexibly mounted to the interior surface of the motor vehicle and the rack respectively in order to compensate for vibratory motion associated with the motor vehicle, which includes impulse-type forced vibration between a suspension system of the motor vehicle and the chassis. Conduits 50 are disposed in head 46 to allow for the flow of the magneto-rheological fluid between the opposing ends of cylinder 42. Magnets 52 are disposed within head 46 adjacent to conduits 50 and are actuated in response to signals from the controller, which receives input from sensors (not shown) that detect and respond to vibratory motion. The actuation of magnets 52 causes a magnetic field to be generated across conduits 50 perpendicularly to the flow of magneto-rheological fluid therethrough.

The magneto-rheological fluid is disposed within cylinder 42 such that fluid communication is maintained across piston 44 through conduits 50. Upon translation of piston 44 within cylinder 42 from one end thereof to the other end thereof in a linear direction, a pressure differential is developed across head 46, thereby causing magneto-rheological fluid to flow from one side of head 46 to the other depending upon the amount shear stress caused by the linear translation of piston 44 within cylinder 42. The shear stress of the magneto-rheological fluid is a controllable function of the magneto-rheological fluid and is variable depending upon the electromagnetic field generated by the actuation of magnets 52, which are typically electromagnets. The pressure differential across head 46, in conjunction with the shear stress, provides a resistance that effectively limits or prevents any vibratory motion from being propagated through cylinder 42. In particular, the control of shear stress of the magneto-rheological fluid is such that the nature of the magneto-rheological fluid can be changed from that exhibiting Newtonian behavior to that exhibing Bingham plastic behavior. Such a change can be effectuated within a very short period of time (e.g., about 1 or 2 milliseconds), thereby providing damping of any vibration experienced by the steerable wheels of the motor vehicle.

Figure 3:
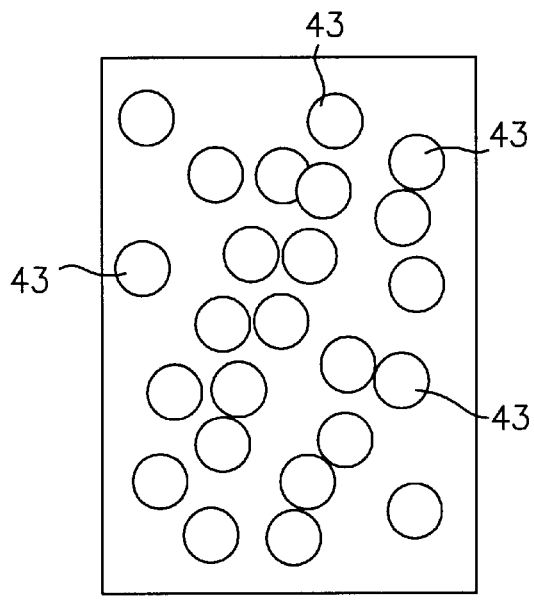
FIG. 3 is a schematic diagram of a random sampling of microspheric particles of a magneto-rheological fluid.
Figure 4:
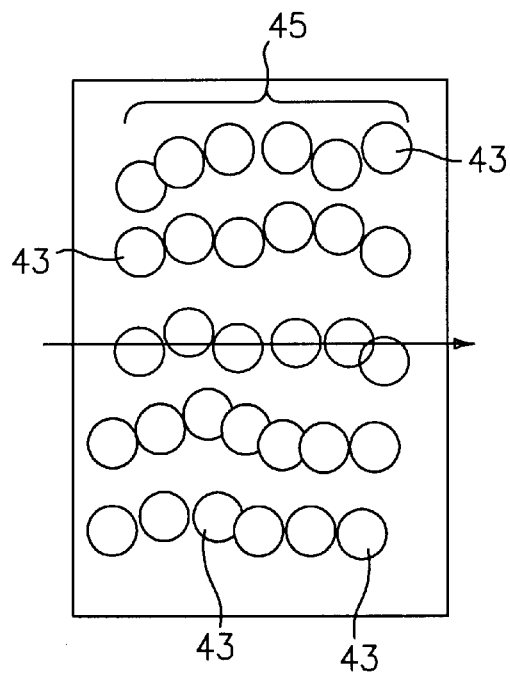
FIG. 4 is a schematic diagram of microspheric particles of a magneto-rheological fluid as they would be if subjected to a magnetizing force.

The magnetization effects on the magneto-rheological fluid are illustrated in FIGS. 3 and 4. In FIG. 3, microspheric particles 43 of the magneto-rheological fluid are shown as they would be if not subject to magnetization. When not subject to magnetization, the magneto-rheological fluid is hereinafter referred to as being in the "off" state, and microspheric particles 43 are randomly arranged. During the off state, the magneto-rheological fluid exhibits Newtonian rheological behavior. In Newtonian rheological behavior, the relationship of the shear rate of the fluid to the shear stress of the fluid is linear. In such a state, the shear stress of the magneto-rheological fluid is the product of the viscosity of the magneto-rheological fluid and the shear rate of the magneto-rheological fluid. Upon being subject to a shear rate, the random nature of the dispersion of microspheric particles 43 provides limited or minimal damping. In effect, all damping is a function of the viscosity of the magneto-rheological fluid.

In FIG. 4, however, microscopic particles 43 of the magneto-rheological fluid are shown as they would be if subject to magnetization. When subject to magnetization, the magneto-rheological fluid is hereinafter referred to as being in the "on" state. In the on state, the random arrangement of microspheric particles 43 are altered such that microspheric particles 43 align to form fibrous structures 45. Upon alignment, the magneto-rheological fluid exhibits Bingham plastic rheological behavior. In Bingham plastic rheological behavior, a linear relationship is maintained between the shear stress of the fluid and the shear rate of the fluid, as in Newtonian flow; however, in Bingham plastic rheological behavior, a finite shear stress is required to initiate the flow. In such a state, the shear stress of the magneto-rheological fluid is equal to the yield stress of the magneto-rheological fluid plus the product of the viscosity of the magneto-rheological fluid and the shear rate of the magneto-rheological fluid. The yield stress is controlled by the application of the magnetic field to the magneto-rheological fluid. Upon being subject to a shear rate in the on state, the change from the random nature of the dispersion of microspheric particles 43 to fibrous structure 45 of the aligned microspheric particles 43 provides increased damping effects.

Upon actuation of the damping system to be in the on state, the increased shear stress caused by the alignment of microspheric particles 43 of the magneto-rheological fluid causes the piston to be cushioned within the cylinder when the damping system is subject to vibration. The damping system, and specifically the cushioning ability thereof, however, may be configured to provide control that is proportional to the degree of vibration. In particular, the power input to the magnets can be adjusted by the controller in order to tune the damping system, thereby proving a shear stress of the magneto-rheological fluid that matches the frequency of the disturbing vibration and effectively canceling out vibration of any degree.

Figure 5:
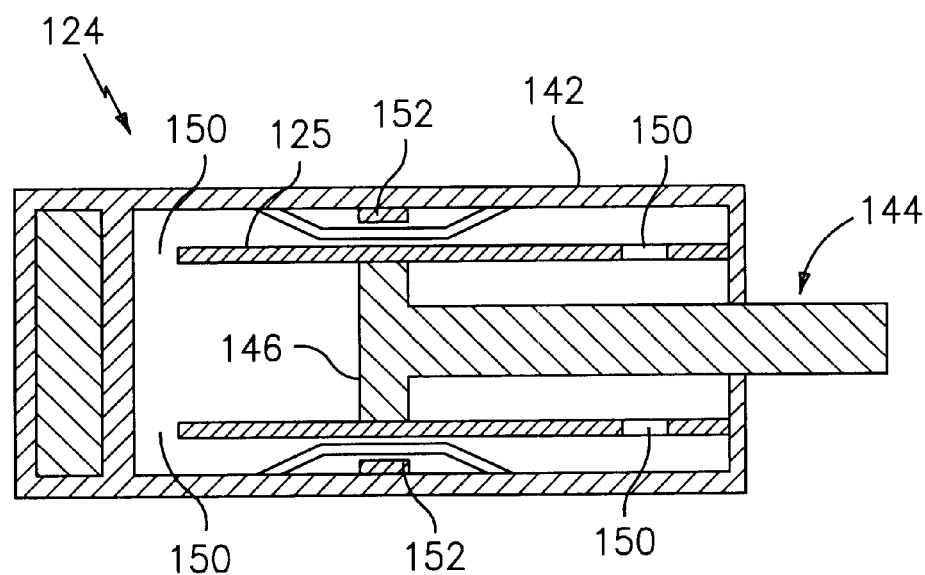
FIG. 5 is a schematic diagram of an alternate embodiment of a linear damping system.

Referring now to FIG. 5, an additional embodiment of damping system 24 of FIG. 2 is illustrated. In FIG. 5, a damping system, shown generally at 124, includes a baffle 125 disposed within a cylinder 142. The configuration of baffle 125 within cylinder 142 forms an annular space between an inner wall of cylinder 142 and baffle 125, in which magnets 152 are disposed. Holes 150 are disposed in baffle 125 proximate opposing ends thereof. A piston, shown generally at 144, is dimensioned to slidingly engage the inner surface of baffle 125. Upon translation of piston 144 within baffle 125, magneto-rheological fluid is forced to flow from one side of a head 146 of piston 144 to the other side through holes 150. The pressure differential between opposing ends of cylinder 142 is greater than the pressure differential is in the configuration of the damping system of FIG. 2. The increased pressure differential provides opportunity for increased amounts of shear to be generated within cylinder 142 upon actuation of the magneto-rheological fluid, thereby allowing vibrations to be damped with less translation of piston 144 within cylinder 142.

Figure 6:
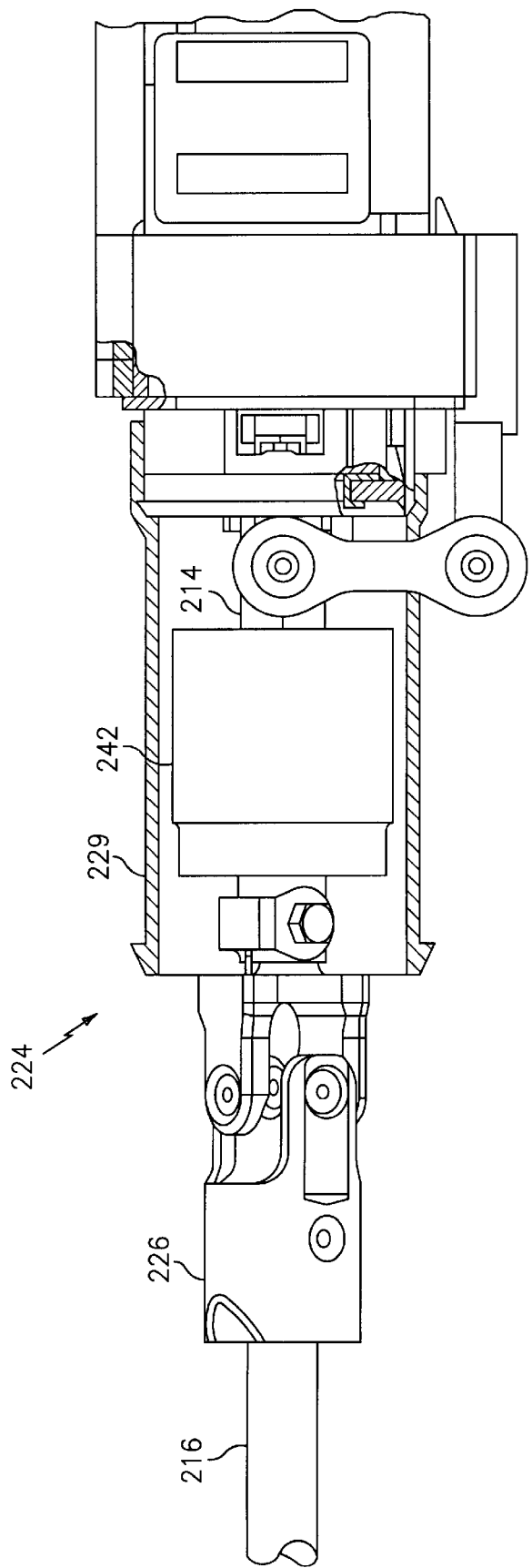
FIG. 6 is a plan sectional view of a rotary damping system.

Referring now to FIG. 6, damping system as it would be mounted on the steering shaft in a rotary configuration is shown generally at 224. Damping system 224 comprises a cylinder 242 through which an upper steering shaft 214 extends and is coupled to a universal joint 226. A boot 229 houses cylinder 242 therewithin. A magneto-rheological fluid is disposed within cylinder 242 between upper steering shaft 214 and an inner surface of cylinder 242. The magneto-rheological fluid is actuatably responsive to a vibration sensor (not shown) through a magnet (not shown) housed within cylinder 242. Upon the sensing of vibratory motion, the sensor signals the controller, which in turn passes an electric current to the magnet thereby actuating the magneto-rheological fluid in cylinder 224 and aligning the discrete particles of the magneto-rheological fluid into fibrous structures. In a manner similar to the operation of damping system 24 of FIGS. 2 and 5, the shear stress of the magneto-rheological fluid can be controlled such that it exhibits either Newtonian behavior or Bingham plastic behavior.

The area of contact between the outer surface of upper steering shaft 214 and the magneto-rheological fluid is dimensioned such that torque sufficient to dampen vibration can be generated by the shearing of the magneto-rheological fluid disposed within cylinder 242. Boundary layer flow of the magneto-rheological fluid within a cavity defined by the outer surface of upper steering shaft 214 and the inner surface of cylinder 242 also causes a pressure differential to be developed within the cavity. Such a pressure differential is amplified by a decreased volume of the cavity, which further contributes to the damping of the vibration. In a typical damping action of damping system 224, the signal transmitted to the magnet from the controller is of a frequency that corresponds to the frequency of the vibration, thereby causing the vibration to be effectively cancelled out. Alternately, as stated above, open-loop control can be used to selectively dampen the vibration in response to vehicle or system parameter inputs that include, but are not limited to, vehicle speed and handwheel angle.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A rotary vibration damping system for a motor vehicle, said rotary vibration damping system comprising:
    a cylinder;
    a steering shaft extending through said cylinder, a first end of said steering shaft being in mechanical communication with a hand steering device of the motor vehicle and a second end of said steering shaft being in mechanical communication with a steering system of the motor vehicle;
    a magneto-rheological fluid disposed between an inner surface of said cylinder and an outer surface of said steering shaft; and
    a magnet disposed in magnetic communication with said magneto-rheological fluid, said magnet being controllable to provide variable control of said magneto-rheological fluid such that when said magnet is activated, said magneto-rheological fluid dampens rotary vibrations in said steering shaft,
    wherein said magnet is variably actuatable in response to a signal from a controller, said signal from said controller is configured to correspond to a vibration sensed by said steering system and to effectuate a change in said magneto-rheological fluid such that a frequency of said vibration sensed by said steering system is substantially equal to a frequency of said signal from said controller.

2. A steering system for a vehicle comprising:
    a hand wheel positioned for operation by a driver at a top end of a steering column, the steering column comprising an upper shaft and a lower shaft and a universal joint connecting said upper shaft with said lower shaft;
    a steering mechanism engaged with a bottom portion of the lower shaft, the steering mechanism translating rotation of said steering column to steering motion of a pair of front wheels of the vehicle;

a vibration sensor sensing vibration of said steering system;

a controller in electronic communication with said vibration sensor, said controller receiving signals from said vibration sensor that are representative of vibration in the steering system;

a damper engaging said steering column, said damper variably damping rotary vibrations in said steering column in response to signals from said controller.

3. The steering system of claim 2 wherein said damper comprises a rotary magneto-rheological fluid damper.

4. The steering system of claim 3 wherein said controller also controls an electric power assist system for said steering system.

5. The steering system of claim 3 wherein said damper is arranged around the upper shaft.

\* \* \* \* \*